United States Patent
Franke

(10) Patent No.: US 6,778,631 B2
(45) Date of Patent: Aug. 17, 2004

(54) DEVICE AND METHOD FOR CONTROLLING CARGO ON CRANE EQUIPMENT WITHOUT CONTACT

(75) Inventor: Klaus-Peter Franke, Dettelbach (DE)

(73) Assignee: Noell Crane Systems GmbH, Würzburg (DE)

(*) Notice: Subject to any disclaimer, the term of this patent is extended or adjusted under 35 U.S.C. 154(b) by 0 days.

(21) Appl. No.: 10/183,294

(22) Filed: Jun. 27, 2002

(65) Prior Publication Data

US 2003/0108150 A1 Jun. 12, 2003

(30) Foreign Application Priority Data

Dec. 12, 2001 (DE) .......................... 101 60 928

(51) Int. Cl.$^7$ ............................................. G01N 23/04
(52) U.S. Cl. ........................................................ 378/57
(58) Field of Search .................... 378/51, 57, 193–195, 378/196, 64, 68, 69

(56) References Cited

U.S. PATENT DOCUMENTS

| 5,638,420 A | * | 6/1997 | Armistead | .................... 378/57 |
| 5,642,393 A | * | 6/1997 | Krug et al. | ................... 378/57 |
| 6,058,158 A |   | 5/2000 | Eiler |  |

FOREIGN PATENT DOCUMENTS

DE 198 26 560 1/1999

* cited by examiner

*Primary Examiner*—Tarifur R. Chowdhury
*Assistant Examiner*—Richard H Kim
(74) *Attorney, Agent, or Firm*—Collard & Roe, P.C.

(57) ABSTRACT

A device for contactless cargo load control for shipping container crane installations, by x-raying the containers in the course of loading and unloading of transport vehicles. An X-ray device for contactless control of the shipping container is mounted on the crane, and the shipping containers are driven through the X-ray device. This offers the advantage that shipping containers can be checked in a quick and safe manner.

8 Claims, 4 Drawing Sheets

DEVICE AND METHOD FOR CONTROLLING CARGO ON CRANE EQUIPMENT WITHOUT CONTACT

BACKGROUND OF THE INVENTION

1. Field of the Invention

The invention relates to a device for controlling cargo in a contactless manner on crane equipment, and to a method for operating the device.

2. The Prior Art

Devices for x-raying piece goods are known and function based on X-rays or gamma rays, as a rule. Such devices are employed for x-raying the luggage of passengers in a suitable manner and for determining whether dangerous objects are contained in the transport container. X-raying methods and devices used for X-raying larger containers such as large cargo shipping containers are known as well. These known X-ray devices are larger units from which X-rays are transmitted through a container or larger cargo shipping container so as to check whether objects and devices not intended for shipment are present in the container. This the case at points where containers or larger shipping containers are shipped across international borders, in particular cargo shipping containers that are transported to other countries with trucks, cargo aircraft or ships.

It is problematic in connection with such devices in that they are located on the ground; and that a transportation means loaded with the container has to drive through the device, which requires that a suitable protective screening for the driver or persons present nearby has to be available. In particular, a separate transloading or transportation operation is needed so that such a container can be x-rayed. Such methods are especially not applicable when a large number of containers have to be quickly loaded and unloaded because long idle time periods or a long docking time for ships in harbors are not possible.

A device is known from U.S. Pat. No. 5,638,420 with which containers are X-rayed from the top by having a vehicle equipped with a cabin drive over the container and X-ray the container from above. German Patent No. DE 198 26 560 A1 discloses a device for checking the contents of sealed cargo carriers, in particular containers, which uses X-rays with which the container is x-rayed from the side by means of an x-ray machine mounted on a vehicle.

Both devices have the drawback that only individual containers can be x-rayed and this only after the container has been lowered to the ground by the crane. This requires a separate device that has to drive over the container.

SUMMARY OF THE INVENTION

It is therefore an object of the invention to develop a device and a method with which containers, in particular cargo containers that are unloaded from freighters, can be quickly and safely X-rayed while they are being unloaded without directly endangering persons.

The solution as defined by the invention provides a device for controlling cargo loads without contact on crane equipment, preferably on cargo container crane equipment by means of x-raying the cargo containers while they are being loaded on and unloaded from transport vehicles. An x-ray machine for controlling the shipping container without contact with the container is arranged on the crane itself. The shipping containers may be containers of different sizes. The containers may be x-rayed in two different ways. The shipping container is either lined up, i.e. it is scanned by means of a movable transmitting and receiving unit, or the shipping container is driven through the X-ray device, so that the transmitting and receiving unit is set up stationary. The x-ray device may function based on X-ray or gamma radiation.

The operating personnel of the crane is protected by a suitable protective screening device if the operator's work station is located near the X-ray device. The protective screening is located between the work station of the operating personnel and the X-ray device.

The X-ray device can be arranged in various locations on the crane. It is advantageous if the X-ray device is arranged below the trolley of the crane, so that after the shipping container has been unloaded from the transport means, it passes through the X-ray device as it is being lifted, and a decision can be made during this phase as to whether the container is released for further transport or not to be unloaded.

According to another variation, the X-ray device is mounted on the trolley carriage and drives along with the carriage. This has the advantage that the shipping container can be X-rayed for a longer period of time as it is driven along the jib of the crane, permitting a more thorough viewing of the loaded goods. If it is found to be suspicious, the unloaded container can be put down in a special container stacking or storage space for further checking purposes.

According to another variation, the x-ray device is unmovably mounted on the jib or bridge of the crane and the crane trolley with the shipping container and the loading device drives through the X-ray device. If the shipping container is driven through the X-ray device that is unmovably mounted on the jib of the crane while the trolley is traveling, the container can be turned by 90°, so that it can be X-rayed from the longitudinal side. This permits brief X-raying of the shipping container, whereupon a decision can be made as to whether the cargo container is shipped on to its destination or has to be deposited in a special location for a more intensive check of its load.

According to another advantageous embodiment of the invention, the X-ray device is arranged in the area of the land-based steel construction of the crane. In that way, the transport container or large cargo shipping container can be checked while it is being lowered in a storage place or onto another transport vehicle. Two possibilities are available for arranging such a device on the land-based part of the steel construction. On the one hand, the shipping container to be lowered can be driven through a rigid or movable shaft or funnel in which it is X-rayed. On the other hand, the shipping container can be deposited on the steel construction in the X-ray device, X-rayed there, and then released for further shipping or lowering onto a transport vehicle.

Conventional cranes can be refitted without problems with such a load-controlling device mounted on crane equipment. The X-ray device can be monitored and the shipping container controlled at a safe distance from the crane, whereby the X-ray device may be coupled with the control of the crane so that after the X-raying process has been completed, a decision is made as to which location the cargo should be transported.

The device as defined by the invention offers the advantage that shipping containers can be quickly and safely X-rayed as they are being loaded and unloaded, whereby a decision can be made immediately after the X-raying operation without any further work step as to whether the shipping container can be released and shipped on, or has to be checked more thoroughly, or even whether the acceptance of the container should be rejected.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
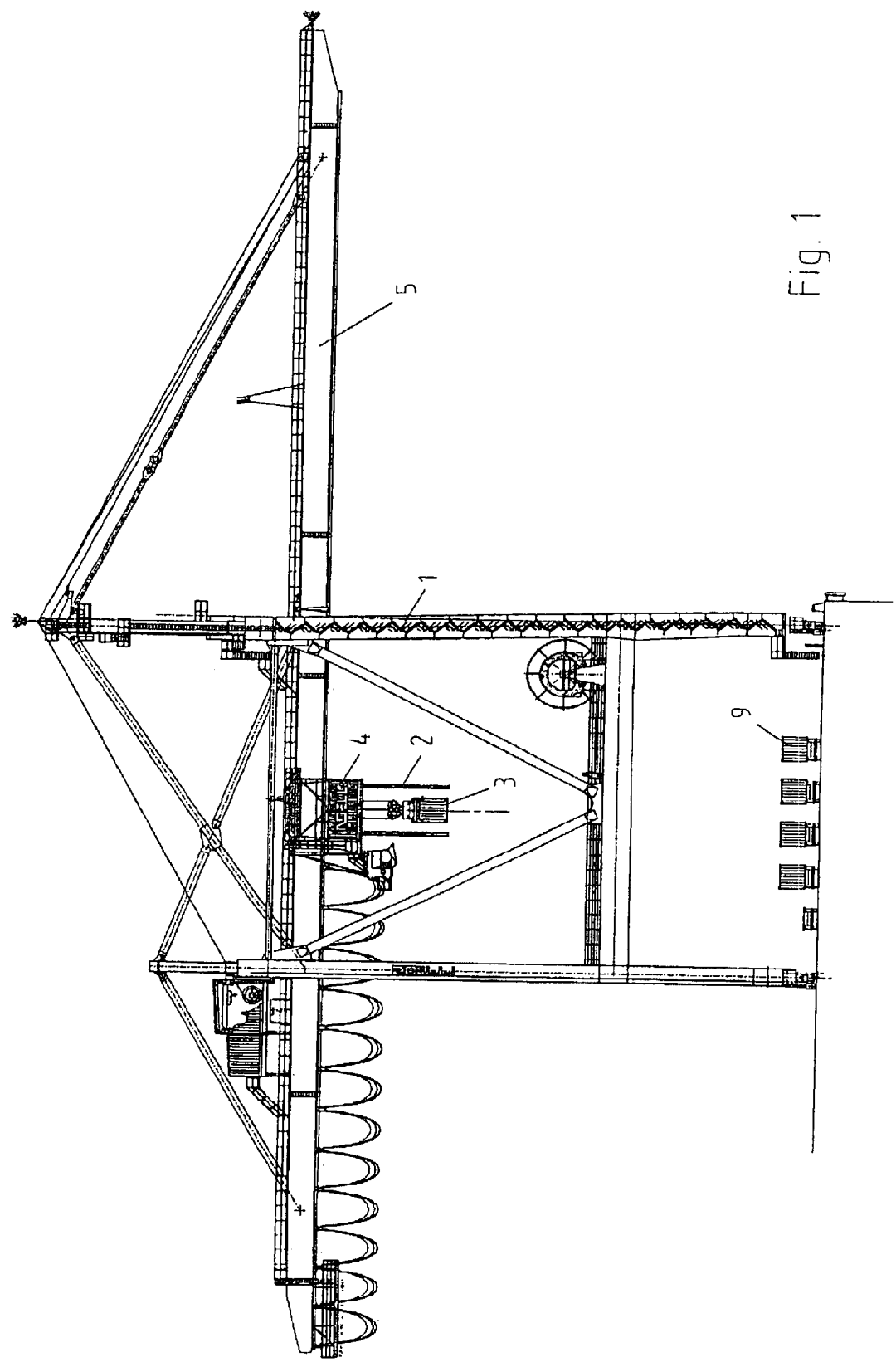
FIG. 1 shows a container crane installation for unloading container ships and loading trucks, in which the X-ray device is mounted below the trolley carriage of the crane and drives along on the jib of the crane.

Referring now in detail to the drawings, FIG. 1 shows a container crane 1 for unloading container ships with a trolley carriage 4 under which a container 3 is located. The container is surrounded by an X-ray device 2. X-ray device 2 with container 3 is driven along the jib 5, whereby the driving time is used for X-raying container 3. Container 3 is then deposited on the dock or the transport vehicle.

Figure 2:
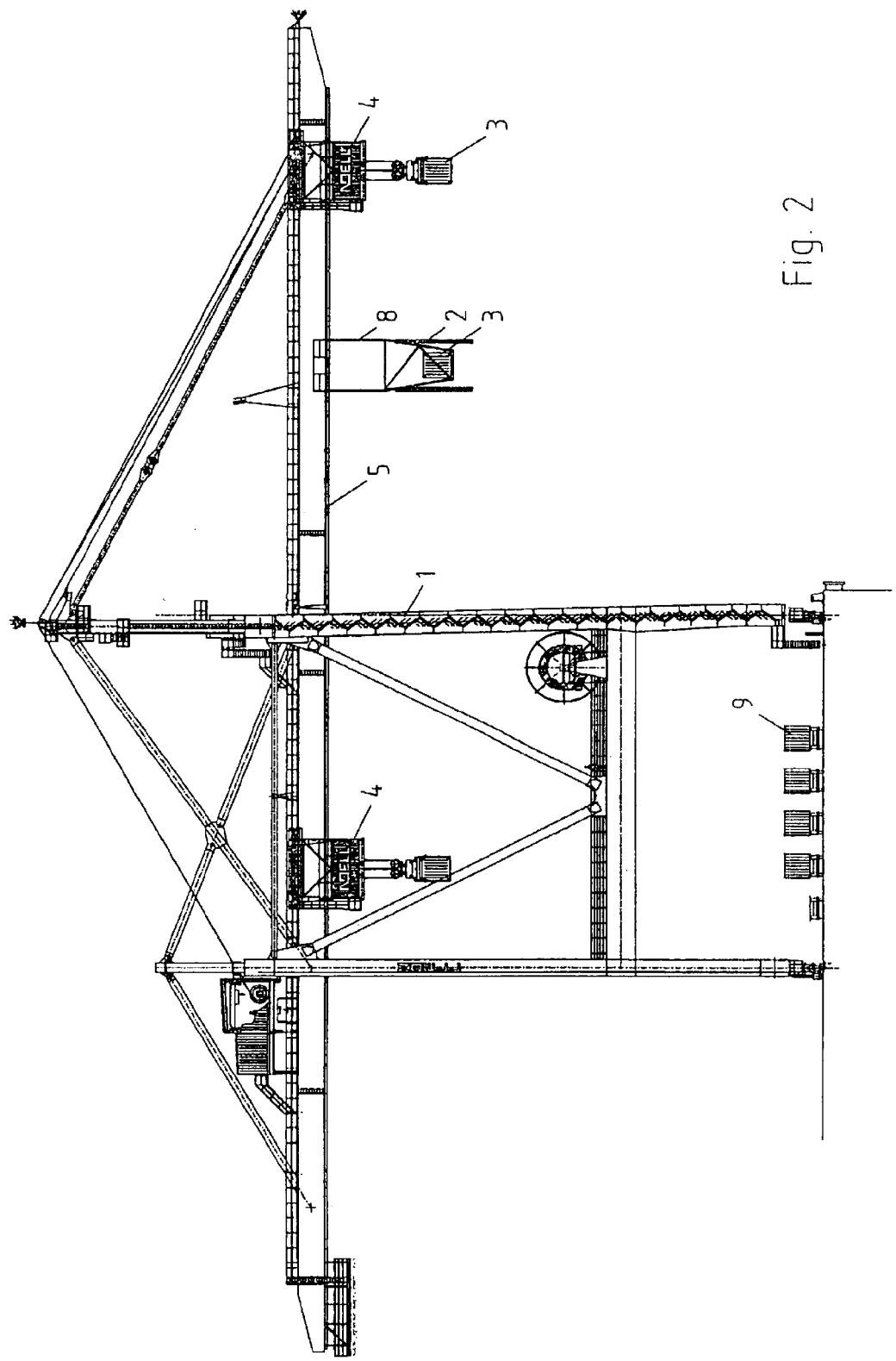
FIG. 2 shows a crane installation with two lifting carriages and one transfer carriage, with the X-ray device mounted on the transfer carriage.

FIG. 2 shows a crane construction 1 with two trolley carriages 4 and one transfer carriage 8, whereby the X-ray device is mounted on the transfer carriage.

Figure 3:
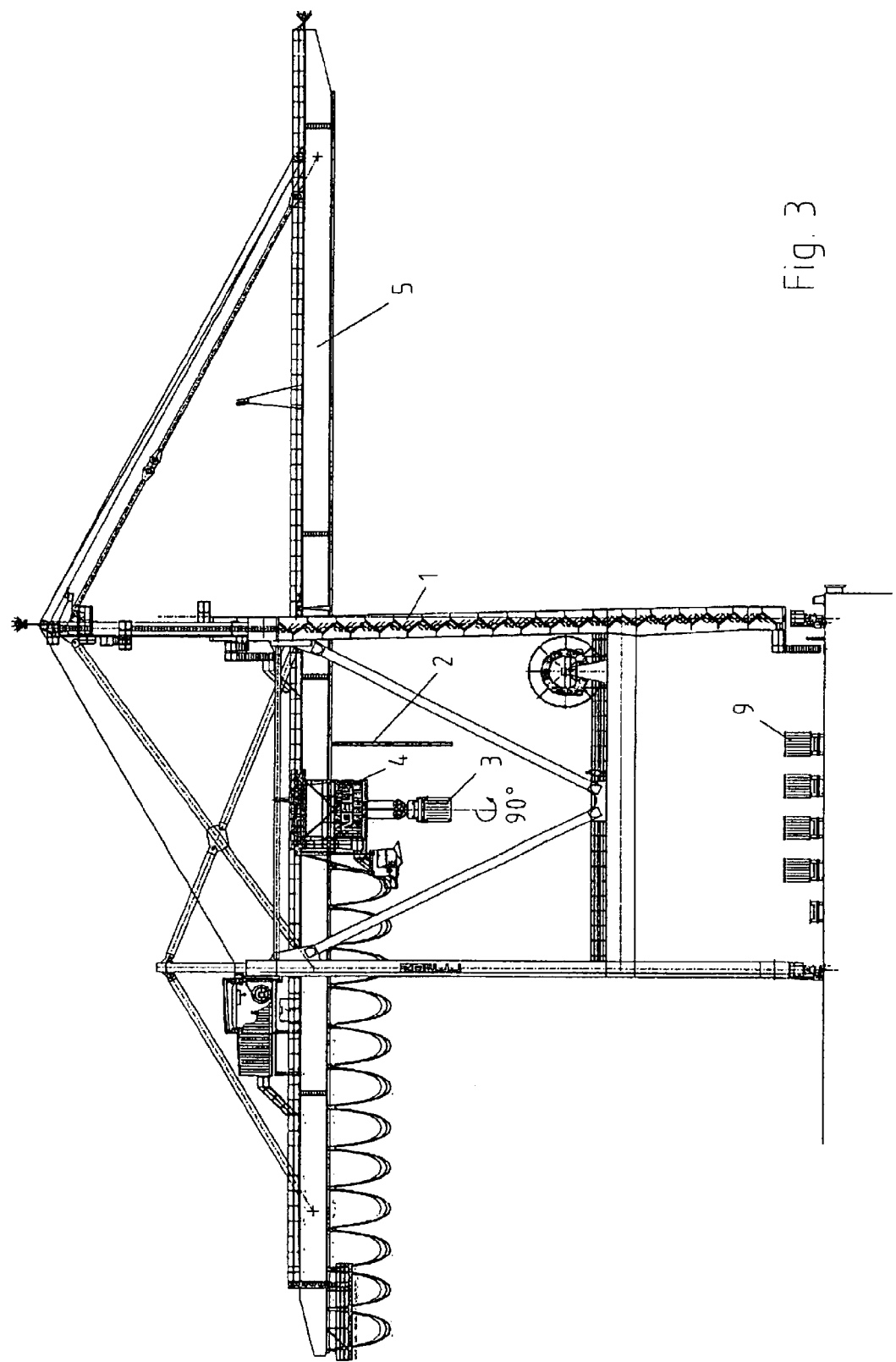
FIG. 3 shows a crane installation in which the X-ray device is rigidly mounted on the bridge of the crane and the trolley carriage with the load to be checked is driven through the X-ray device (container turned by 90°)

FIG. 3 shows a crane 1 with a jib and a crane bridge 5, whereby an X-ray device 2 is mounted on crane bridge 5. Shipping container 3 is driven through X-ray device 2 below the trolley carriage 4. The container is turned by 90°.

Figure 4:
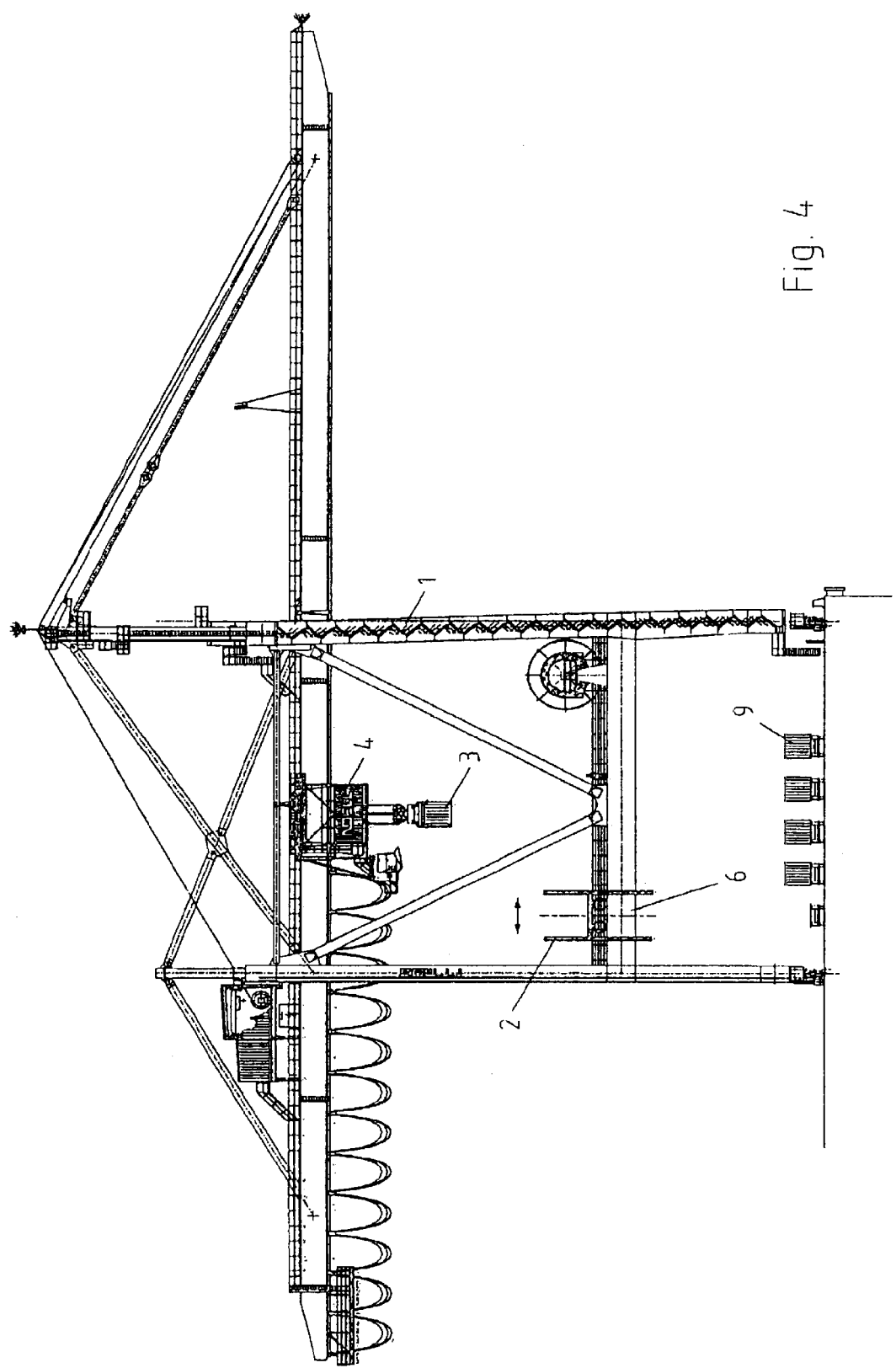
FIG. 4 shows a container crane where the X-ray device is movably mounted in the area of the crane construction located on land.

FIG. 4 shows a crane 1 with a trolley carriage 4 under which a container 3 is located. In the present case, X-ray device 2 is located in the area of the steel construction 6 based on the shore side. In this case, X-ray device 2 has the shape of a funnel and is arranged with horizontal mobility on the crossbeam of steel construction 6 so that it can be driven across the vehicle 9 to be loaded. In this way, the lowered shipping container 3 can be driven through X-ray device 2 and X-rayed, whereupon the container is lowered onto the dock or the vehicle 9.

The proposed variations of the invention offer the advantage that shipping containers can be quickly and safely X-rayed directly while they are being transported on the crane, so that no additional expenditure is required in terms of time, organization and equipment for controlling the shipping containers 3.

Accordingly, while only a few embodiments of the present invention have been shown and described, it is obvious that many changes and modifications may be made thereunto without departing from the spirit and scope of the invention.

What is claimed is:

1. A device for controlling shipping containers said device being mounted on crane installations and controlling in a contactless manner, by means of X-raying in the course of loading and unloading of transport vehicles via the crane, comprising:

a trolley disposed on the crane for transporting the shipping containers from the transport vehicles; and an X-ray device mounted on the crane for contactless control of the shipping container, said container being driven on the trolley toward or through the X-ray device.

2. The device according to claim 1, wherein said X-ray device is arranged below/above the trolley.

3. The device according to claim 2, wherein said X-ray device is arranged so that said X-ray device is displaced together with said trolley.

4. The device according to claim 1, wherein the X-ray device is mounted on a jib or crane bridge in an area of a trolley track so that piece goods to be transported are driven through the X-ray device.

5. The device according to claim 1, wherein the X-ray device is rigidly mounted on a land-based steel construction of the crane so that piece goods to be transported are driven through the X-ray device.

6. The device according to claim 1, wherein the X-ray device is movably mounted on a land-based, steel construction of the crane so that piece goods to be transported are driven through the X-ray device.

7. The device according to claim 1, wherein the X-ray device is mounted on a multi-trolley crane.

8. A method for controlling shipping containers mounted on crane installations in a contactless manner, by means of an X-ray device in the course of loading and unloading of transport vehicles, comprising:

X-raying a shipping container containing piece goods with the X-ray device while the shipping container is being lifted or lowered or driven by a trolley and also while such container is being intermediately deposited on a construction of the crane, and deciding based on the result of the X-raying process as to whether the X-ray piece goods are returned to their place of origin, sorted out, or transloaded for further transport.

* * * * *